(No Model.)  3 Sheets—Sheet 1.

G. W. LARAWAY & D. SLATE.
PULP MOLDING MACHINERY.

No. 258,236. Patented May 23, 1882.

Witnesses:
Chas. L. Burdett
W. H. Marsh

Inventors:
Geo. W. Laraway
Dwight Slate
By W. E. Simonds, Atty.

(No Model.)  3 Sheets—Sheet 2.

G. W. LARAWAY & D. SLATE.
PULP MOLDING MACHINERY.

No. 258,236. Patented May 23, 1882.

Witnesses:
Chas. L. Burdett
W. H. Marsh

Inventors:
Geo. W. Laraway
Dwight Slate
By W. E. Simonds,
Atty.

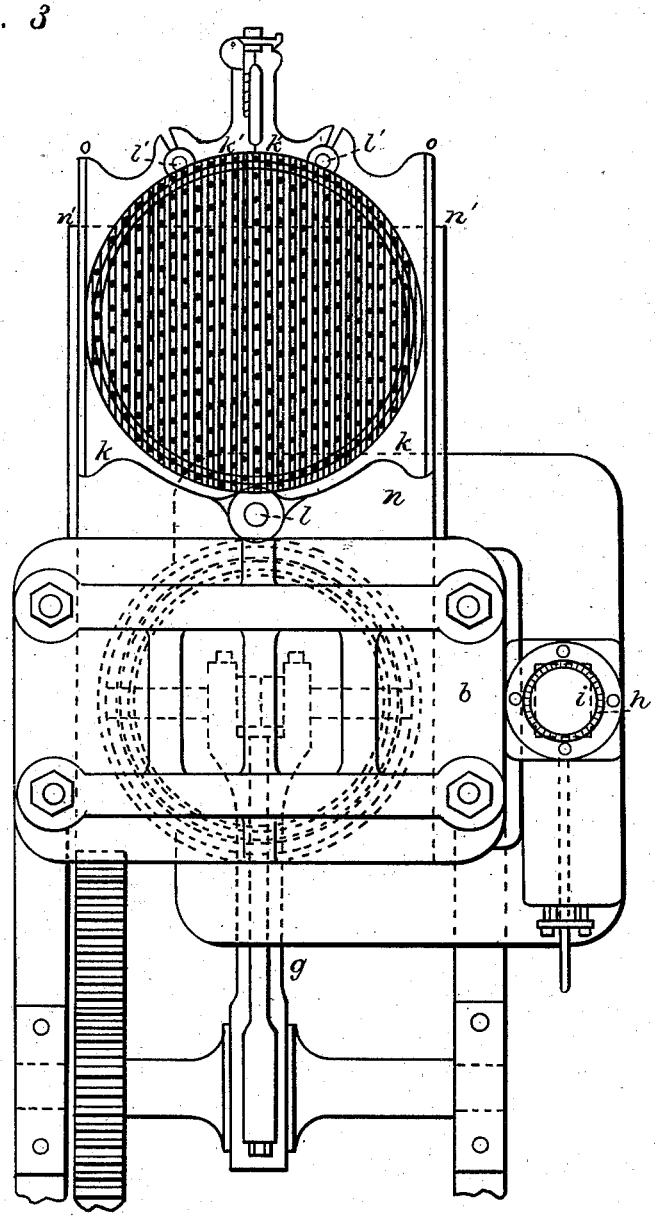

UNITED STATES PATENT OFFICE.

GEORGE W. LARAWAY AND DWIGHT SLATE, OF HARTFORD, CONN., ASSIGNORS TO THE AMERICAN PAPER BARREL COMPANY, OF SAME PLACE.

PULP-MOLDING MACHINERY.

SPECIFICATION forming part of Letters Patent No. 258,236, dated May 23, 1882.

Application filed February 7, 1881. (No model.)

*To all whom it may concern:*

Be it known that we, GEORGE W. LARAWAY and DWIGHT SLATE, of Hartford, in the county of Hartford and State of Connecticut, have invented a certain new and useful Improvement in Pulp-Molding Machinery, of which the following is a description, reference being had to the accompanying drawings, where—

Figures 1, 4, 5, 6:
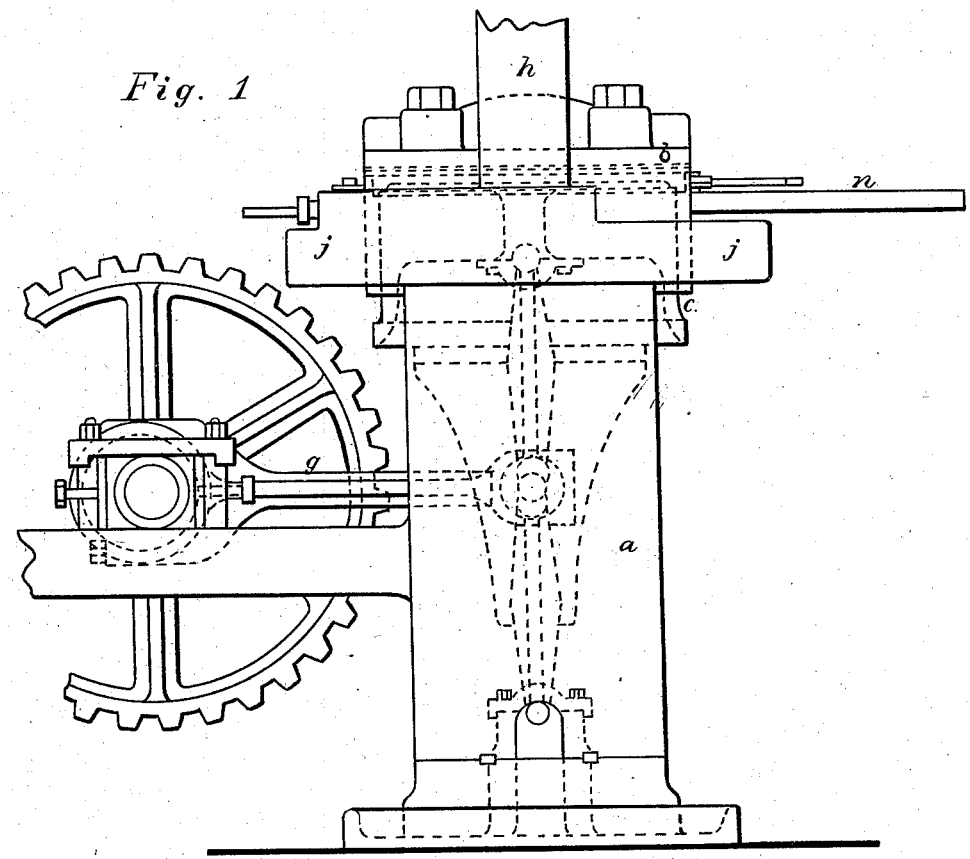
Figure 2:
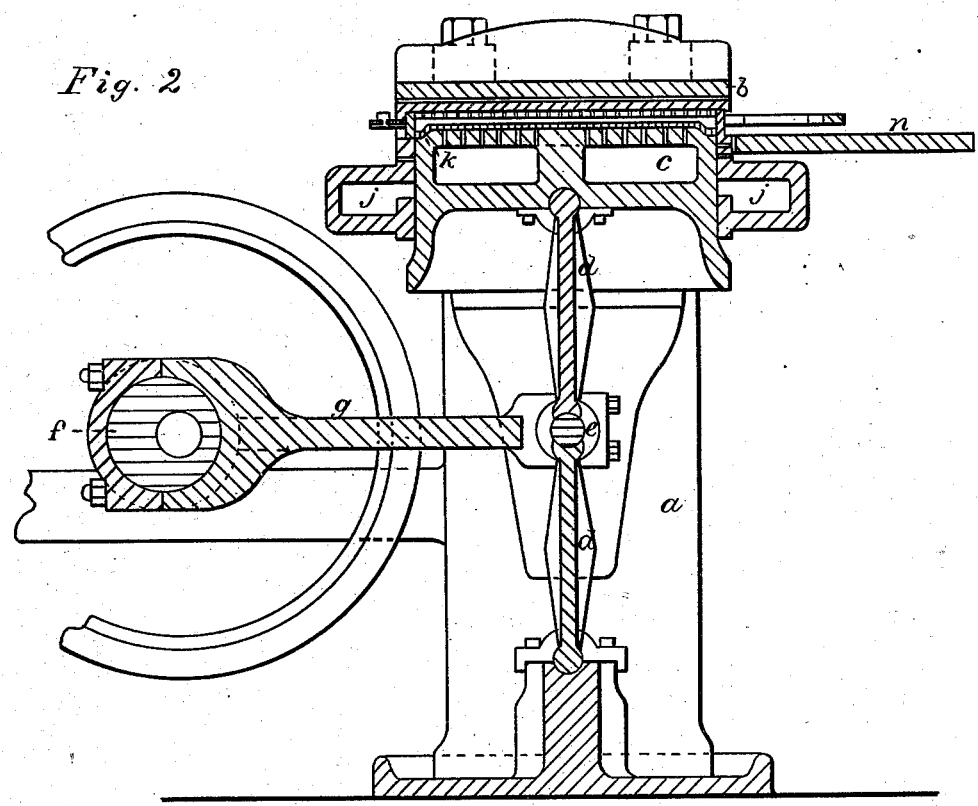
Figure 7:
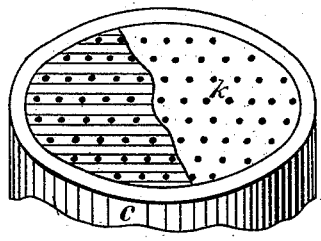
Figure 8:
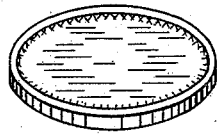

Figure 1 is a side view of a machine for molding a barrel-head from pulp, constructed in accordance with said invention. Certain interior parts are outlined in dotted or broken lines. Fig. 2 is a view of the same machine in central vertical section. Fig. 3 is a top or plan view of the same machine with the removable matrix-case (hereinafter more fully described) drawn out laterally from the place it occupies in the machine, as represented in Figs. 1 and 2. Fig. 4 is a detail view showing said removable matrix-case cut in central vertical section. Fig. 5 is a detail view showing the removable cover of said removable matrix-case. The upper layer of corrugated and perforated metal is represented as partially broken away to expose the under layer, a finely-perforated mold-face, and this finely-perforated mold-face is in turn represented as partially broken away. Fig. 6 is a detail view of said removable matrix-case, a rear elevation of the same. Fig. 7 is a detail view representing the upper portion and face of the plunger. The upper layer of metal, a finely-perforated mold-face, is represented as partially broken away to expose to view the corrugated and perforated body beneath. Fig. 8 is a view of the product of the machine—a barrel-head.

The machine shown in the drawings is intended for forming a barrel-head from paper-pulp, forming the material into shape and expressing the water at one and the same operation. This barrel-head is in shape a disk, with a turned-up peripheral rim, in other and general terms a round box with very low walls or sides, and the principles of the mechanism are applicable to the production of boxes and other packages and articles.

The standards $a\ a$ form the main part of the frame of the machine. They have a suitable base at the foot, and are united at the top by the cross-plate $b$, which is firmly bolted to the standards. The upper part of the frame is formed into a circular piston-chamber or plunger-chamber, wherein the piston or plunger $c$ has short and powerful vertical reciprocation. The barrel-head is formed by the upward movement of the plunger between the top of the plunger and the bottom of the cross-plate $b$, there being an intermediate mold-face, referred to hereinafter.

The vertical reciprocation of the piston or plunger is given by means as follows: The letters $d\ d$ denote two toggle-arms, jointed at the center of their length on the shaft $e$. The lower arm is jointed at its lower end to a portion of the general frame. The upper arm at its upper end is jointed to the piston or plunger $c$. Shaft $e$ has its requisite vibratory motion given from the rotating eccentric $f$, the strap $g$ of which reaches to shaft $e$. Suitable means are employed to start and stop the rotation of the eccentric. It will be readily seen that this combination of eccentric and toggle-joint is a means for moving the piston of great power.

The pulp, preferably contained in an overhead tank so that it may descend and flow into the machine by gravity, comes to the machine through a feed-pipe, $h$, which has a suitable gate, $i$, and thence by distributing-conduits $j\ j$, more or less in number, finds access to the piston-chamber at different points. At the time that the pulp flows into this chamber the piston is below the delivery-mouths of conduits $j\ j$. These delivery-mouths are seen in Fig. 2.

The barrel-head is formed with the annular peripheral rim on the lower side of the disk part of the head.

The upper end or face of the piston is formed to give shape to the under side of the barrel-head, or, considered as a box, to the inside of the box. The face of the piston is covered with a finely-perforated mold-face, $k'''$, usually a thin sheet of brass having extremely-fine perforations, a sort of wire gauze fastened to the body behind it by fine screws, or in any other suitable manner. (Soldering has been found to work well.) The face of the plunger under the finely-perforated mold-face (see Fig. 7) is corrugated and perforated through and through for the escape of the expressed water.

The interior or wall of the piston-chamber is lined with a similar finely-perforated mold-face, and the wall (see Fig. 2) is similarly perforated for the escape of expressed water.

We will now describe the removable matrix-case. This consists, speaking generally, of a band or ring, which forms the periphery, exterior, or circumference of the barrel-head, which is within or forms a part of the piston-chamber while a barrel-head is being formed, has the barrel-head formed within it, and after the head is formed is removed from the piston-chamber, carrying the barrel-head, and the barrel-head then taken from it. This hoop, ring, or band is made in sections $k\ k\ k'\ k'$, pivoted or hinged together. Sections $k\ k$ are pivoted together by pivot $l$. Sections $k'\ k'$ are hinged to sections $k\ k$ by pivots $l'\ l'$, in order that the hoop may be opened to remove a barrel-head. All are held together, when that adjustment is desired, by the catch $m$. The inner side of this hoop is covered with a finely-perforated mold-face, and the wall behind it (see Fig. 6) is grooved or corrugated and perforated for the escape of the expressed water. This hoop slides laterally into and out of the piston-chamber, forming practically a part of the wall of that chamber while a barrel-head is being formed. When drawn out from the chamber it rests on the table $n$. The matrix-case has at the sides way-flanges $o\ o$, sliding on and against the guides $n'\ n'$ of the table $n$.

The hoop just referred to has a cover (shown separately in Fig. 5) consisting of a ring or annular flange, $o'$, a finely-perforated mold-face, $p$, and an upper and outer corrugated and perforated plate, $r$. This cover lies on the hoop while the hoop is in the machine and the barrel-head is being formed, but is drawn out of the machine preparatory to removing a barrel-head.

We claim as our invention—

1. The combination of the piston, the resisting-surface opposed to the piston, and the laterally-removable matrix-case, all substantially as described, and for the purpose specified.

2. The removable matrix-case, made of sections hinged together, to the end that the case may be opened, substantially as described, and for the purpose set forth.

3. As a part of a pulp-molding machine, the removable matrix-case provided with a movable cover, substantially as described, and for the purpose specified.

4. The combination of the eccentric, the toggle-arms, and the piston, all substantially as described, and for the purpose specified.

GEORGE W. LARAWAY.
DWIGHT SLATE.

Witnesses:
W. E. SIMONDS,
JAMES J. GREENE.